United States Patent [19]
Kong

[11] Patent Number: 4,951,839
[45] Date of Patent: Aug. 28, 1990

[54] MEASUREMENT AND DISPENSING UNIT

[76] Inventor: Cheung T. Kong, 6122 Whittier Blvd., Los Angeles, Calif.

[21] Appl. No.: 307,612

[22] Filed: Feb. 7, 1989

[51] Int. Cl.$^5$ .............................................. G01F 11/26
[52] U.S. Cl. ..................................... 222/47; 222/192; 222/437; 222/454; 141/322
[58] Field of Search ..................... 222/205, 424.5, 434, 222/437–438, 440, 454, 457, 556, 47, 49–50, 192; 229/103.1; 239/33; 141/319–320, 322

[56] References Cited

U.S. PATENT DOCUMENTS

| | | | |
|---|---|---|---|
| 569,180 | 10/1896 | Donally | 141/382 X |
| 2,038,418 | 4/1936 | Conner | 222/446 |
| 2,387,374 | 10/1945 | Watters | 222/455 |
| 2,428,233 | 9/1947 | Livadas | 222/455 |
| 2,530,012 | 11/1950 | Gronemeyer et al. | 222/449 |
| 2,790,581 | 4/1957 | Harter | 222/455 |
| 2,803,270 | 8/1957 | Carbone, Jr. | 141/322 |
| 2,887,254 | 5/1959 | Menderman | 222/450 |
| 2,977,028 | 3/1961 | Joffe | 222/454 X |
| 3,091,374 | 5/1963 | Schwartzman | 222/448 |
| 3,097,769 | 7/1963 | Payne | 222/437 |
| 3,141,585 | 7/1964 | Emmert | 222/434 |
| 3,362,590 | 1/1968 | Martin | 222/465.1 |
| 3,515,312 | 6/1970 | Heier | 222/437 X |
| 3,844,454 | 10/1974 | Buchtel | 222/553 |
| 4,143,794 | 3/1979 | Stratford et al. | 222/42 |
| 4,151,934 | 5/1979 | Saeki | 222/437 |
| 4,364,492 | 12/1982 | Kong | 222/205 |
| 4,474,312 | 10/1984 | Donoghue | 222/205 |
| 4,747,521 | 5/1988 | Saffron | 222/205 |

FOREIGN PATENT DOCUMENTS

| | | | |
|---|---|---|---|
| 282408 | 12/1964 | Australia | 222/454 |
| 236786 | 9/1987 | European Pat. Off. | 141/319 |
| 239285 | 9/1987 | European Pat. Off. | 222/205 |
| 1397362 | 12/1965 | France | 222/454 |
| 425513 | 4/1935 | United Kingdom | 222/454 |

Primary Examiner—Michael S. Huppert
Attorney, Agent, or Firm—Kelly, Bauersfeld & Lowry

[57] ABSTRACT

An improved economically disposable dispensing unit is provided for dispensing various measured amounts of a liquid or other freely flowing substance from a container. The position of a movable sleeve within a cup-shaped housing determines the measured amount which will be trapped within a dispensing chamber defined by the housing. The sleeve may be adapted for sliding movement to change positions, or, as an alternative, the sleeve can have a foldable, accordion-like structure which allows adjustment of the sleeve position. The invention can be configured as a disposable, one-piece dispensing unit, wherein one of a plurality of one-piece units, each having a different sized sleeve integrally formed therein, is chosen to select a particular measured amount. The dispensing unit is attached to a container by a flexible spring loop or a plurality of gripping fingers. The dispensing unit can be detached to allow dispensing of medication, or the like, as by drinking directly from the dispensing chamber, or the unit can remain attached to the container during dispensing. In the latter case, a valve covers the sleeve to ensure dispensing of only the measured amount. In one form, the cup-shaped housing is collapsible on the container to a low profile configuration while storing a measured quantity within the dispensing chamber.

23 Claims, 5 Drawing Sheets

MEASUREMENT AND DISPENSING UNIT

BACKGROUND OF THE INVENTION

This invention relates generally to a device for dispensing a measured amount of a liquid or other relatively freely flowable substance from a container. More particularly, this invention relates to a dispensing unit having a relatively inexpensive and simple construction which allows for economic disposal of the unit after use.

Apparatus for dispensing measured amounts of liquid or other relatively freely flowable substances are generally known in the art. Typically, such devices consist of a dispensing structure adapted to mount onto a container and include relatively complex inserts or cooperating sleeve arrangements designed to trap a measured amount of the liquid when the container is inverted or squeezed. These dispensing devices have generally used a fixed geometry designed to deliver a single measured amount, although some devices have included adjustable components for obtaining variable measured amounts. These dispensing devices have been intended for dispensing, for example, medicine dosages, recipe ingredients, laundry detergent quantities, etc.

Examples of these kinds of devices include applicant's co-pending application, Ser. No. 07/106,711 and applicant's U.S. Pat. No. 4,364,492, as well as U.S. Pat. No. 2,428,233; U.S. Pat. No. 3,091,374; U.S. Pat. No. 3,844,454; U.S. Pat. No. 4,143,794; U.S. Pat. No. 4,151,934 and U.S. Pat. No. 4,474,312.

Prior dispenser devices as described above have required relatively complex structures and/or multiple components requiring assembly, thereby resulting in a relatively costly device. As a result, such dispenser devices have been limited to repetitive use situations wherein the device is used over and over. Unfortunately, due to the viscosity or stickiness of the substance being dispensed, repeated use often results in clogging of measurement passages, thus ruining the accuracy of the measurement or causing the device to fail completely. Moreover, repeated use of the dispenser device requires periodic cleaning and/or sterilization, especially when the device is to be used, for example, by different patients in a hospital setting. These disadvantages have led to general non-use of dispenser devices in favor of standard disposable medicine cups. There exists, therefore, a significant need for an improved liquid dispenser device which is simple and economical to manufacture such that it can be discarded after a single use. Moreover, there exists a need for a disposable dispenser device having a geometry adaptable for use with various container sizes and enabling a user to easily measure and dispense the desired quantity. The present invention fulfills these needs and provides further related advantages.

SUMMARY OF THE INVENTION

In accordance with the invention, an improved and economically disposable dispensing unit is provided for dispensing a measured amount of liquid or other flowable substance. The dispensing unit generally comprises a cup-shaped housing having a geometry for substantially sealed attachment to a relatively wide range of container sizes. The cup-shaped housing defines an upwardly open dispensing chamber and includes means for easily obtaining a measured quantity from the contents of the container. Advantageously, the dispensing unit of the present invention can be configured to collapse to a low profile geometry with the measured quantity preserved therein during handling or transport.

The cup-shaped housing comprises a circular side wall extending upwardly from a bottom wall and cooperating therewith to define the dispensing chamber. An open central sleeve extends upwardly through an opening in the bottom wall to provide a flow path placing the dispensing chamber in fluid communication with a storage compartment defined within the underlying container. The dispensing unit includes adjustable attachment means for attaching the unit onto the container, and a removable cap for providing a top wall covering the dispensing chamber. The entire unit is disposable and is manufactured in a relatively simple and inexpensive fashion. In one form of the invention, a one-piece design ideal for sanitary "throw-away" dispensers is achieved by forming a hinged cap, the sleeve, and the attachment means integrally with the housing.

In operation, the dispensing chamber is closed by fitting the cap in substantially sealed relation with the housing side wall. The container is then inverted to allow a liquid or other flowable substance stored in the storage compartment to flow through the open sleeve and into the dispensing chamber. The sleeve end within the dispensing chamber, henceforth referred to as the measurement end, determines the measured quantity by its position relative to the housing side wall defining the dispensing chamber. The sleeve also provides a flow path of sufficient size for air displaced from the dispensing chamber by the flow of the stored liquid to vent from the dispensing chamber into the inverted container. Upon the return of the container and the attached dispensing unit to the upright position, the contents of the dispensing chamber disposed above the sleeve measurement end drain back into the storage compartment, thus leaving the desired measured amount defined by the chamber contents disposed below the sleeve measurement end. The dispensing unit is then detachable from the container to facilitate dispensing as by direct drinking of the measured amount contained therein.

In order to preserve the accuracy of a measured amount stored in the dispensing chamber for transport, the circular side wall of the housing may include a flexible lower portion adapted to be folded to a collapsed configuration of reduced volume without removing the dispensing unit from the container. This reduced volume is sufficient to store the measured amount. In conjunction with this collapsible version of the invention, the cap which closes the dispensing chamber includes a boss or plug located to close the sleeve measurement end when the side wall is collapsed.

Various measured amounts can be obtained by varying the position of the sleeve measurement end relative to the side wall of the housing. This relationship can be varied by the provision of a slidably adjustable sleeve within the housing, or a sleeve having a foldable accordion-like structure which allows the sleeve to be retracted or extended to various positions. In either case, a horizontal indicator arm may be attached to the measurement end of the sleeve so that a measured amount can be selected by adjusting the sleeve position to align the indicator arm with indicia on the side wall which correspond to various volume levels.

If it is desired to dispense the measured amount from the dispensing unit without detaching the dispensing unit from the container, valve means is provided to close the sleeve when the cap is moved to an open position. In this case, the cap is provided with a slotted boss or elongated prongs to open valve flaps on the sleeve when the cap is in a closed position, thus allowing flow through the sleeve during inversion of the container.

Alternatively, the dispensing unit can be provided with a cap that is configured with an integrally formed cylindrical straw holder designed for accommodating a disposable drinking straw therein. In this embodiment, the straw holder is situated within the dispensing compartment such that leakage will not occur through the straw holder upon inversion of the dispensing compartment.

In yet another modification of the invention, the measurement end of the sleeve is configured with a 180° rim which extends approximately ¼" above the remainder of the measurement end, thereby providing a guard which prevents leakage through the central sleeve when the dispensing compartment is tilted for drinking therefrom.

Advantageously, the geometry of the unit attachment means is adaptable for use with a wide variety of container sizes. The preferred attachment means comprises a plurality of flexible latching fingers integrally formed with the bottom or side wall of the dispensing unit and having a pawl-like structure for engaging a threaded neck portion or lip of the container. Alternatively, the attachment means can comprise a flexible spring loop connected to an exterior surface of the bottom wall of the dispensing unit and adapted to fit securely into an open neck portion of the container.

Other features and advantages of the present invention will become more apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figures 1, 2, 5, 16:
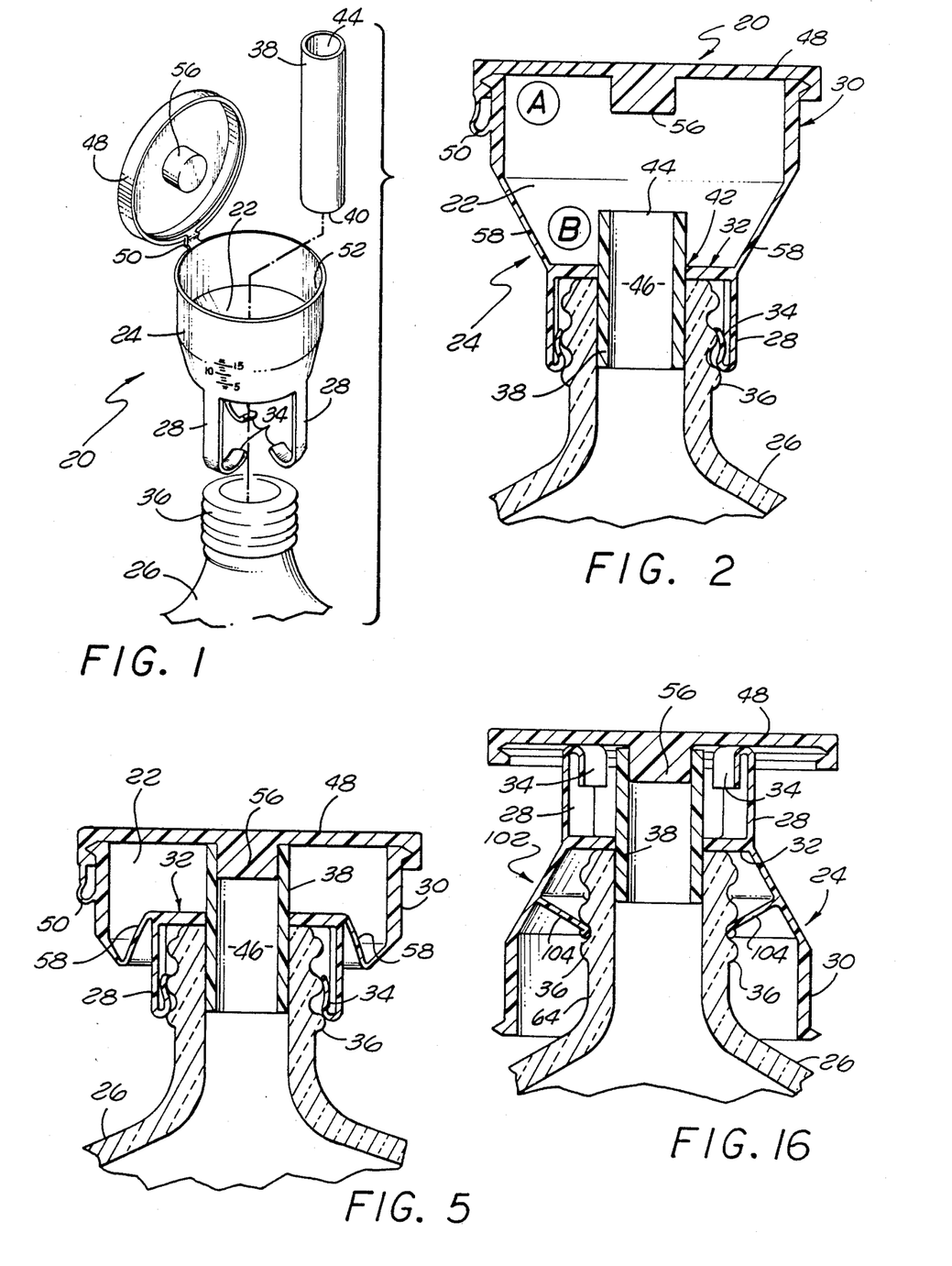
FIG. 1 is an exploded, fragmented perspective view of a liquid dispensing unit embodying one preferred form of the invention and illustrating a measurement sleeve which fits into a cup-like housing.
FIG. 2 is a fragmented, cross sectional view of the dispensing unit including the measurement sleeve.
FIG. 5 is a fragmented, cross sectional view of the dispensing unit of FIG. 2, illustrating the unit in a collapsed storage configuration.
FIG. 16 is a fragmented, cross sectional view illustrating an alternative embodiment of the invention, wherein the dispensing unit is inverted from the orientation shown in FIG. 2 to function as closure means for the container.

As shown in the exemplary drawings, the present invention relates to an improved and economically disposable dispensing unit 20 for easily dispensing an accurate measured amount of a liquid or other relatively free flowing substance from a container. As illustrated in FIG. 1, the dispensing unit 20 defines a dispensing chamber 22 formed by a cup-shaped housing 24 that is removably attachable to the neck or top of an underlying container 26. The dispensing unit 20 is utilized to trap within the dispensing chamber 22 a measured amount of the liquid from the container 26. The present invention advantageously comprises disposable, throwaway components which allow measured medicine dosages, or the like, to be dispensed in a sanitary manner. The dispensing unit can be discarded after a single use and economically replaced by a new unit, thereby avoiding problems such as clogging or unsanitary conditions which arise with repeated use of the same dispenser. Another advantage of the dispensing unit is that a measured amount can be stored within the dispensing unit 20 for handling or transport while the accuracy of the measured amount is preserved in the sealed dispensing chamber 22 (FIG. 5).

Referring now to FIGS. 1 and 2, the dispensing unit 20 is provided with means for attachment onto a variety of different size containers 26. The illustrative dispensing unit 20 is shown with a plurality of flexible, gripping fingers 28 extending downwardly from a lower portion of the cup-shaped housing 24 which is comprised of a cylindrical side wall 30 and a bottom wall 32. Each gripping finger 28 terminates in a lower end 34 which is upwardly angled and projects inwardly for engagement with threads 36 or a lip (not shown) of a container neck. The flexible nature of these gripping fingers 28 allows them to be flexed outwardly so that they can fit snugly over various sized container necks with the axially upper end of the container neck urged into substantially sealed relation with the housing bottom wall 32, as viewed in FIG. 2. Alternatively, gripping fingers can be provided which fit snugly within various sized container necks. In another alternative form, the gripping fingers 28 can be provided on a separate lower attachment piece, within which the cup-shaped housing 24 is snugly secured by a friction fit.

The container 26 provides an internal reservoir 27 for storage of the liquid to be dispensed therefrom. This storage reservoir 27 is placed in fluid communication with the dispensing chamber 22 of the attached dispensing unit 20 through an open central sleeve 38 within the cup-shaped housing 24. The central sleeve 38 has an open lower end 40, which extends through a hole 42 in the bottom wall 32 of the housing 24 to open into the storage reservoir of the container 26, and an open upper or measurement end 44 which extends upwardly from the bottom wall 32 to open into the dispensing chamber 22. Accordingly, the sleeve 38 defines an open flow path 46 from the interior of the container to the interior of the housing. In the preferred form, the sleeve 38 is snugly but slidably mounted within the hole 42, for adjustment purposes to be described in more detail.

The dispensing chamber 22 is normally closed by a removable cap 48 which can be separate from the dispensing unit, or, as shown in FIGS. 1-5, integral therewith by means of a flexible hinge 50. All components of the dispensing unit 20 may be comprised of formed paper or a relatively inexpensive molded plastic. Preferably, the cylindrical side wall 30 of the housing 24 is made of transparent plastic to permit viewing of internal components.

In order to obtain a measured quantity from the container 26, the dispensing unit 20 is mounted onto the container and the open top end 52 defined by the cylindrical side wall 30 of the housing 24 is closed by the cap 48. The container 26 and its attached dispensing unit 20 are then inverted as viewed in FIG. 3, to allow the liquid stored in the container to flow into the dispensing chamber 22 via the central sleeve 38. The flow path 46 defined by the sleeve 38 has a sufficient diameter to provide the requisite exchange of liquid and air, thus allowing air displaced from the dispensing chamber 22 by flow of the incoming liquid, to vent from the dispensing chamber and into the container. A sleeve inside diameter on the order of one half inch will define a flow path of sufficient size to allow for this liquid/air exchange.

Figure 3:
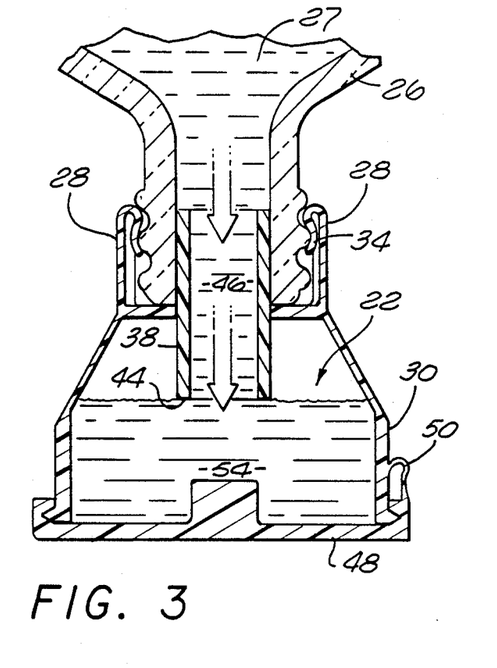
FIG. 3 is a fragmented, cross sectional view of the dispensing unit when inverted, and illustrating a liquid level blocking the measurement sleeve to prevent further flow.

Upon inversion, the liquid 54 will continue to flow from the container 26 into the dispensing chamber 22 until the liquid reaches a level covering the measurement end 44 of the central sleeve 38 (FIG. 3). Once the liquid level blocks the measurement end 44 of the sleeve 38, further liquid flow is precluded by blockage of any vent path for air escape from the chamber 22. In this regard, the dispensing unit 20 is configured such that the measurement end 44 of the sleeve relative to the cylindrical side wall 30 is located at a position whereby, upon inversion, a quantity of liquid greater than or equal to the desired measured amount will flow into the dispensing chamber 22.

Figure 4:
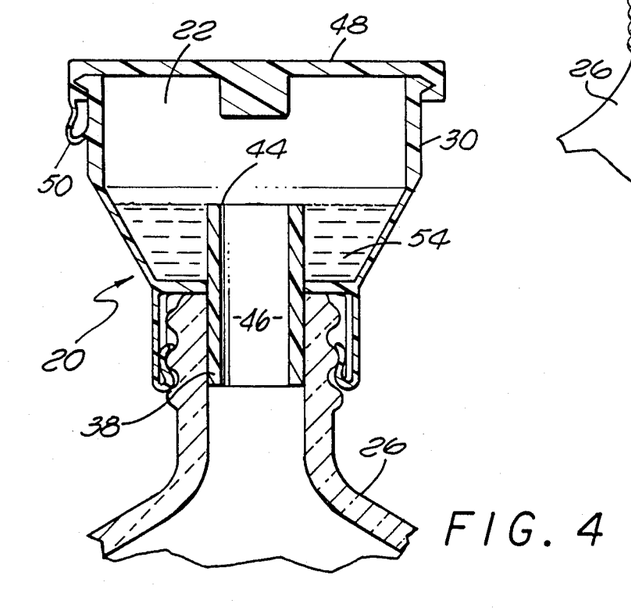
FIG. 4 is a fragmented, cross sectional view of the dispensing unit of FIG. 3, illustrating a measured amount of liquid trapped therein upon return of the unit to an upright position.

When the liquid 54 blocks the sleeve measurement end 44, the container 26 and attached dispensing unit 20 are returned to an upright position. This action may allow a small quantity of liquid to drain back into the container reservoir via the sleeve 38, although the desired measured amount of liquid will be trapped within the dispensing chamber. More particularly, the remaining liquid in the dispensing chamber 22 will be at a level substantially corresponding to the measurement end 44 of the sleeve 38, as shown in FIG. 4. The measured, trapped quantity of liquid may then be dispensed by detaching the dispensing unit 20 from the container 26, opening the cap 48 and pouring the contents from the dispensing unit. Advantageously, in the case of medications and the like, the dispensing unit 20 may be used as a drinking cup for direct drinking of the contents.

The volume of liquid which initially enters the dispensing chamber 22 during inversion should be in excess of the measured amount in order to compensate for the small amount of the liquid which will escape through the sleeve 38 during the return of the dispensing unit 20 to the upright position. For this reason, the volume of the measured amount should not exceed about one half of the total volume of the dispensing chamber 20. Thus, as a design guideline, the volume B (FIG. 2) of the dispensing chamber 20 disposed beneath the measurement end 44 of the sleeve 38 should be at least slightly less than the volume A which is situated above the sleeve measurement end 44. This criteria applies to each of the preferred embodiments which will be described herein.

Referring now to FIG. 2, the present invention can allow for variance of the measured amount by moving the slidable central sleeve 38 in an upward or downward direction to vary the position of the sleeve measurement end 44, relative to the side wall 30 of the cup-shaped housing 24. Such variance of the sleeve position results in a variance of the volumes A and B, thereby changing the amount of liquid which can be trapped within the dispensing chamber 22 when the dispensing unit is reinverted as previously described.

FIGS. 2-5 also illustrate the structure of the cup-shaped housing 24 which provides another advantageous feature of the invention. More specifically, the cap 48 has an inwardly extending boss or plug 56 located on the underside thereof in a position directly above the sleeve measurement end 44 when the cap 48 is closed. In addition, a lower portion 58 of the side wall 30 of the cup-shaped housing 24 is constructed of a thin flexible material and normally extends angularly downwardly and radially inwardly toward the bottom wall 32. This flexible lower side portion 58 permits the housing 24 to collapse to a low profile geometry with the portion 58 folded upon itself, as viewed in FIG. 5.

In the collapsed or folded position, the plug 56 on the cap 48 fits into the measurement end 44 of the sleeve 38 to substantially seal off the dispensing chamber 22 from fluid communication with the liquid stored in the container 26. This sealed-off dispensing chamber 22 allows for transportation or handling of the dispensing unit while storing a predetermined quantity within the chamber 22 and in a manner which will preserve the accuracy of the measurement. Importantly, the measured amount is maintained irrespective of removal of the dispensing unit from the container. This storage feature enables parents to measure and store a medicine dosage for their child which can then be consumed later by the child at a different location, such as school, without requiring the child to measure the amount. The child can then discard the disposable dispensing unit if desired.

Figures 6, 7, 8, 9, 10:
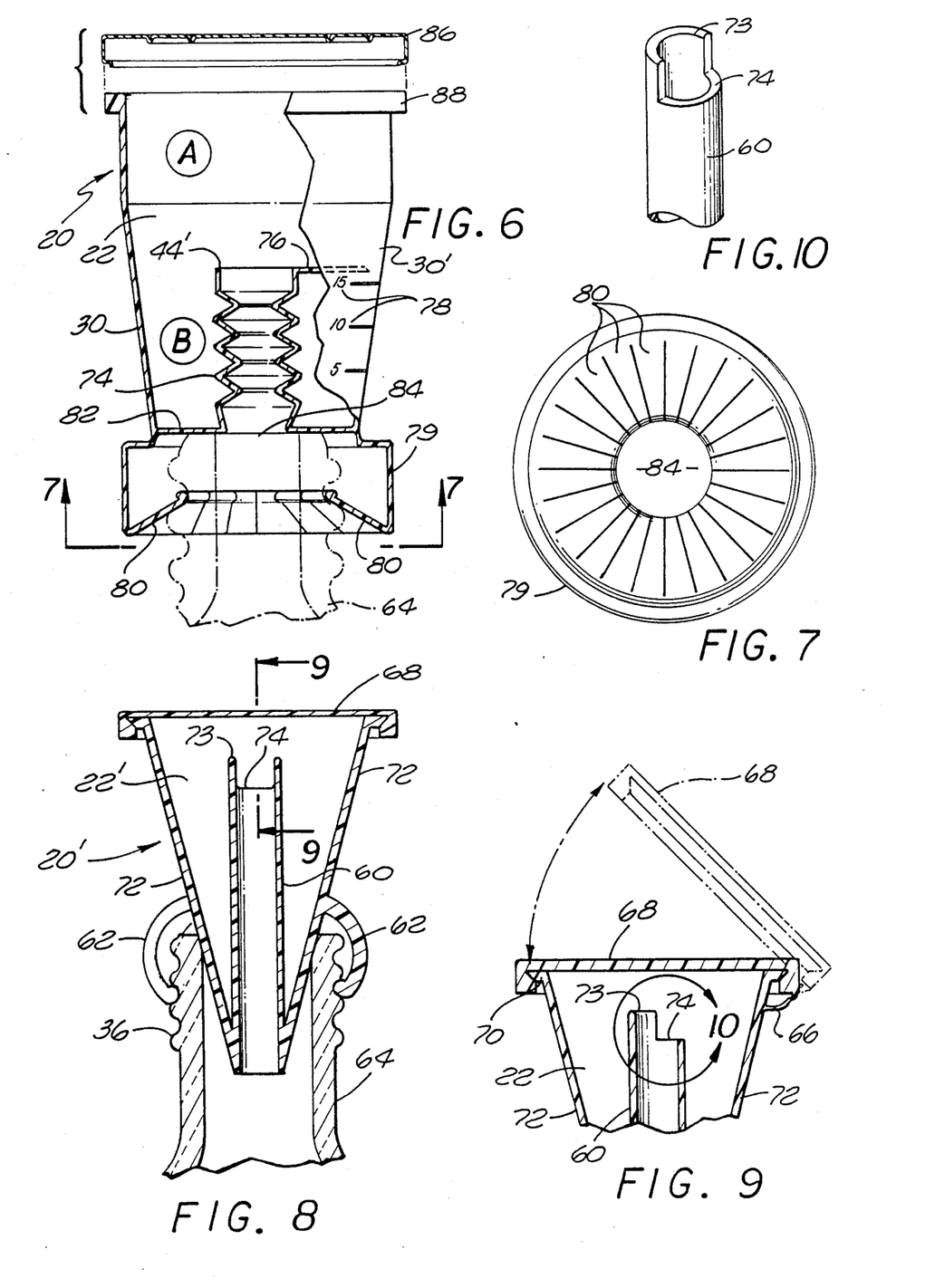
FIG. 6 is a cross sectional view of one alternative embodiment of the dispensing unit showing a foldable measurement sleeve.
FIG. 7 is a bottom plan view taken generally along line 7—7 of FIG. 6, and illustrating an arrangement of attachment arms.
FIG. 8 is a fragmented, cross sectional view of another alternative embodiment of the dispensing unit, illustrating a one-piece disposable unit situated atop a container.
FIG. 9 is a fragmented, cross sectional view taken generally along line 9—9 of FIG. 8, illustrating a hinged cap forming an integral portion of the unit.
FIG. 10 is a fragmented perspective view of the measurement sleeve portion found within circle 10 in FIG. 9, illustrating an upraised rim for preventing leakage during dispensing.

As one alternative to the dispensing unit illustrated in FIG. 1, another "throw-away" embodiment of the invention is shown in FIGS. 8 and 9. In this version, the entire dispensing unit 20, is constructed as one piece with a cap, attachment arms and a measurement sleeve all integrally formed within a cup-shaped housing. This disposable dispensing unit 20' utilizes a central sleeve 60 to provide the measured amount as previously discussed. Adjustable, flexible attachment arms 62 are included so that the one-piece dispensing unit 20 can be mounted onto a variety of container sizes by manipulating the arms to fit around a neck 64 of a selected container. A cone-shaped housing 72 is utilized to provide a narrow lower end adapted to fit snugly into the container neck with the attachment arms 62 locking the unit in place.

A cap 68 is attached to the top of the dispensing unit 20' by a flexible hinge 66 (FIG. 9). The cap 68 is snapped shut over the top of the dispensing unit 20 during inversion of the unit, and is held in place by the snug fit provided by engagement of the cap 68 with a flanged upper lip 70 on the conical side wall 72. After the measured amount has been trapped within a dispensing chamber 22', the cap 68 is opened as shown in dotted lines in FIG. 9 and the dispensing unit is detached from the container so that the measured quantity can be dispensed by drinking or the like. In order to prevent leakage through the sleeve 60 when the dispensing unit 20' is tilted for drinking therefrom, an upraised rim 73 (FIGS. 8-10) is provided atop the sleeve 60. The rim 73 extends approximately ¼" above a lower edge 74 of the sleeve 60 and runs about 180° around the top of the sleeve. The location of the rim 73 atop the sleeve 60 should be directly opposite the hinge 66, as indicated in FIG. 9.

In order to obtain various measured amounts, a plurality of one-piece, disposable dispensing units are provided, with each having a sleeve 60 of different height for providing a different measured amount of liquid. A selected one of the units is utilized to provide the selected measured amount which is chosen by utilizing the particular unit having a sleeve size for delivering the desired quantity. Each one-piece unit may also include indicia which identifies the measured volume to be obtained therefrom.

In another preferred embodiment of the invention (FIGS. 6 and 7), the measured amount can be varied by using foldable, accordion-like structures to vary the height of a sleeve measurement end 44' relative to a housing side wall 30'. More particularly, FIG. 6 shows an accordion-like sleeve 75 which can be extended or collapsed to vary the position of the measurement end 44' relative to the cylindrical side wall 30'. In this manner, the specific measured amount to be trapped upon return of the apparatus to an upright position can be varied. Alternatively, the side wall 30' can be formed as a foldable, accordion-like structure to allow the position of the measurement end relative to the side wall to be varied by extending or retracting the foldable side wall.

In either case, a horizontal indicator arm 76 extends outwardly from the measurement end 44' of the sleeve 75 to provide means for choosing a selected one of a plurality of different measured amounts to be dispensed. The side wall 30' includes indicia 78 which corresponds to various volume levels. The foldable, accordion-like sleeve 75 is extended or collapsed until the desired volume setting is aligned with the indicator arm 76.

This embodiment of FIGS. 6 and 7 also includes modified attachment means in the form of adjustable attachment arms 80 for engagement with a variety of different sized container necks 64. A bottom wall 82 of the dispensing unit 20 has an opening 84 therethrough with the sleeve 75 extending upwardly therefrom. A lower housing segment 79 extends downwardly from the bottom wall 82 and terminates in the radially inwardly directed attachment arms 80 for frictionally engaging a container neck. The attachment arms 80 securely retain the container neck in substantially sealed engagement with the bottom wall 80. In addition, a removable cap 86 is included for closing the dispensing chamber 22 during inversion. Preferably, the upper end of the dispensing unit 20 is flanged (as indicated at 88) to provide a snug fit with the removable cap 86.

Figure 11:
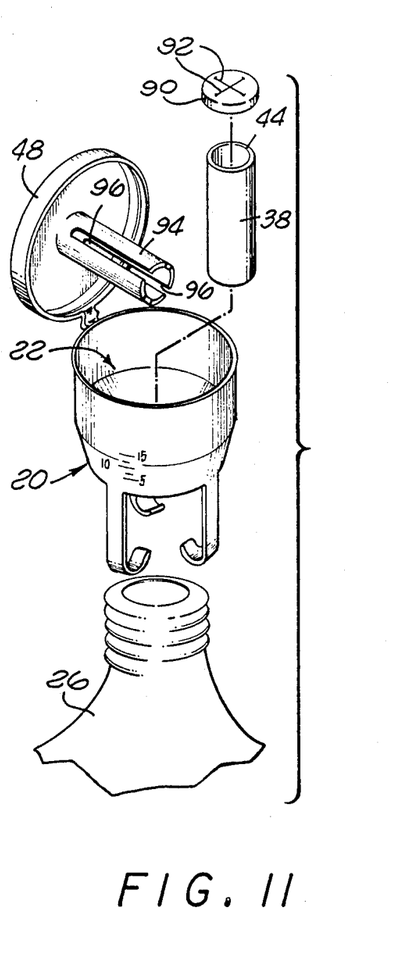
FIG. 11 is an exploded, fragmented, perspective view of a dispensing unit having a modified cap and illustrating valve means for closing a flow path defined by the measurement sleeve.
Figures 12, 13:
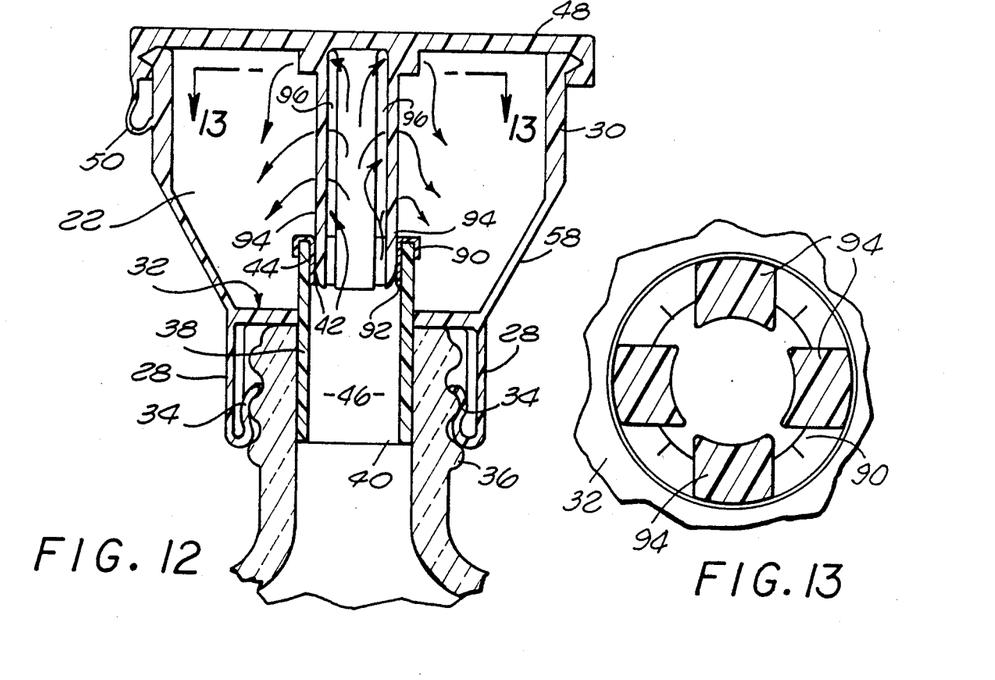
FIG. 12 is a fragmented, cross sectional view of the dispensing unit of FIG. 11, illustrating the valve means in an open position.
FIG. 13 is a fragmented, cross sectional view taken generally along line 12—12 of FIG. 12.

As a further alternative to the invention, FIGS. 11–13 illustrate the dispensing unit 20 of FIG. 1 adapted to include valve means on the measurement sleeve 38 to permit dispensing from the unit without requiring unit removal from the container 26. More particularly, a plastic valve disk 90 (FIG. 11) having a plurality of central, flexible flaps 92 is mounted at the sleeve measurement end. As illustrated, the valve disk 90 is sized to fit snugly over the sleeve with the flaps 92 obstructing the measurement end 44 of the sleeve 38 to substantially prevent liquid and air exchange through the sleeve. When the flaps 92 are in this position, a measured amount of liquid can be dispensed from the dispensing unit 20 as by drinking therefrom while the dispensing unit remains attached to the container. In this case, additional flow of liquid from the container will be prevented by the valve disk.

The valve disk 90 can be left in place atop the sleeve 38 while the apparatus is inverted and returned to an upright position to trap a measured amount in the dispensing chamber 22. Prior to inversion of the apparatus, the cap 48 is snapped over the top of the dispensing unit 20 to close the dispensing chamber. In this embodiment, the cap includes inwardly extending, elongated prongs 94 which engage and depress the flexible flaps 92 within the sleeve measurement end 44. This arrangement, viewed in FIGS. 12 and 13, effectively opens the valve disk and allows the measured amount to flow into the dispensing chamber. Importantly, the precise measured amount can be varied by moving the sleeve 38, as long as the sleeve position remains within a range wherein the prongs will engage the flaps. The prongs 94 depress the flaps 92 of the valve 90 such that, upon inversion, the liquid can pass from the container 26, through the flow path 46, past the depressed flaps 92, and through the spaces 96 between the prongs 94 to enter the dispensing chamber 22.

After the measured amount has been obtained, opening of the cap 48 to prepare for dispensing will remove the prongs 94 from their position within the measurement end 44 of the sleeve 38. Such prong removal is accompanied by return of the flexible flaps 92 to the closed configuration as shown in FIG. 11 to block further flow through the sleeve during dispensing.

Figure 17:
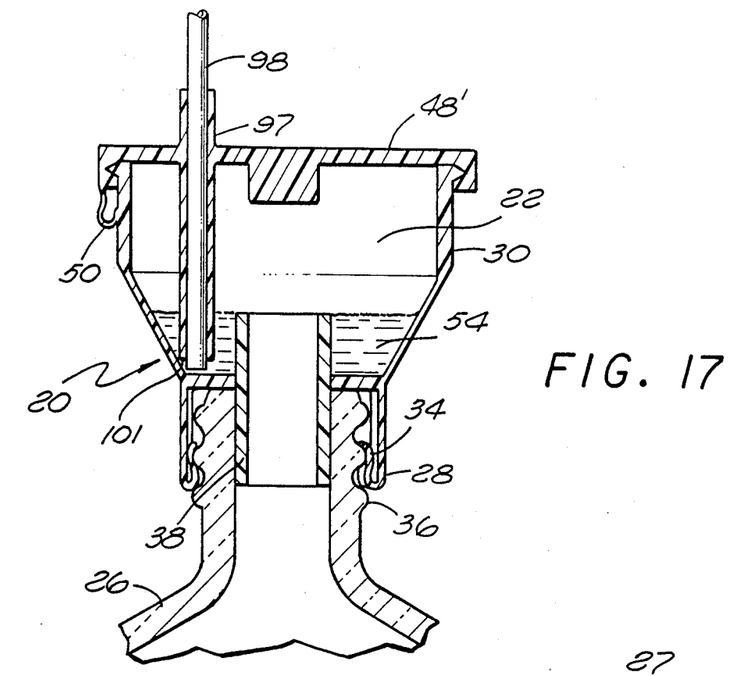
FIG. 17 is a fragmented, cross sectional view of the dispensing unit illustrating a straw holder integrally formed with the cap and a disposable straw situated within the straw holder.
Figure 18:
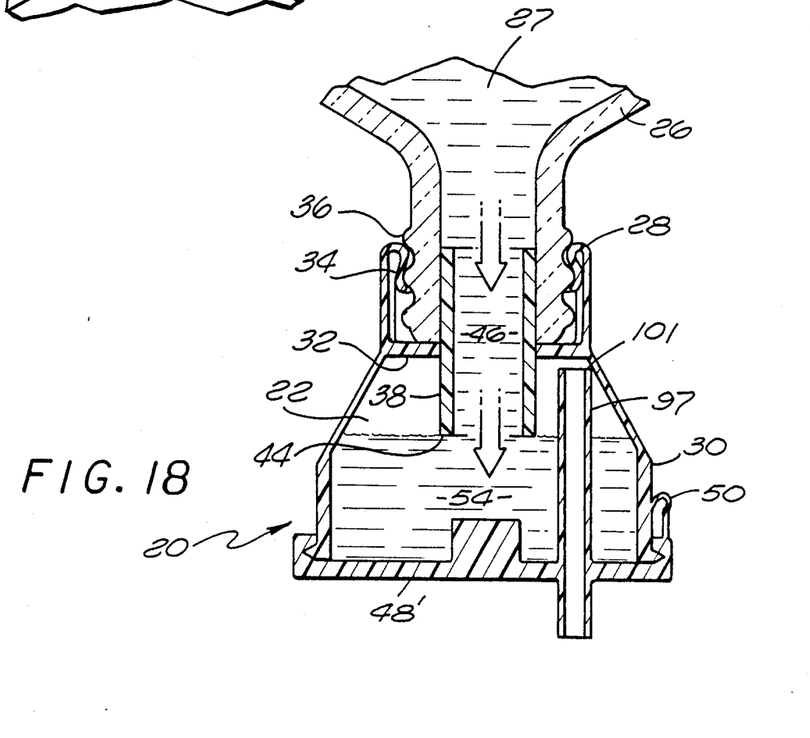
FIG. 18 is a fragmented, cross sectional view of the dispensing unit of FIG. 17 in an inverted position with the straw removed from the straw holder, illustrating how the straw holder is situated within the dispensing unit in a manner preventing leakage.

In a modified version of the invention (FIGS. 17 and 18), dispensing from the dispensing chamber 22 is facilitated by the provision of a straw holder 97 which accommodates a drinking straw 98. The straw holder 97 is integrally formed with a cap 48' and comprises a cylindrical sleeve that is open at each of its ends.

Design guidelines for inclusion of the straw holder 97 are as follows. The straw holder 97 should be situated on the cap 48, adjacent the hinge 50 in a location which allows the holder 97 to swing clear of the sleeve 38 whenever the cap 48, is opened or closed. In addition, as best viewed in FIG. 18, the straw holder 97 must extend into the dispensing chamber 22 such that its end 101 is above the sleeve measurement end 44 when the dispensing unit 20 is inverted. Preferably, the holder end 101 should be spaced just slightly from the housing bottom wall 32 in order to prevent the liquid 54 from leaking through the straw holder 97. Leakage is avoided upon inversion because, as previously discussed, the liquid level will stop rising once it meets the measurement end 44 and thus will be unable to further accumulate to a level sufficient to begin draining through the holder end 101. The straw holder 97 advantageously enables disposable straws 98 to be discarded after a single use, thereby providing a very sanitary dispenser while also eliminating any clogging and stickiness that may otherwise result, for example, with repeated use of a straw passageway for dispensing cough syrup. In use, the disposable straw 98 is not inserted within the straw holder 97 until after the completion of an inversion step has trapped a measured amount within the dispensing chamber.

Figure 14:
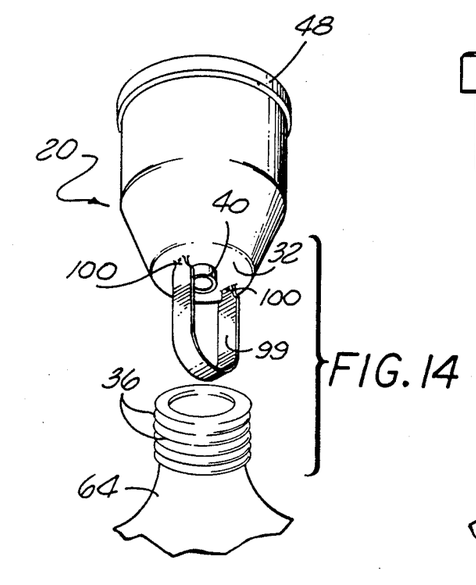
FIG. 14 is a fragmented, perspective view of a dispensing unit having alternative means for attachment to a container.
Figure 15:
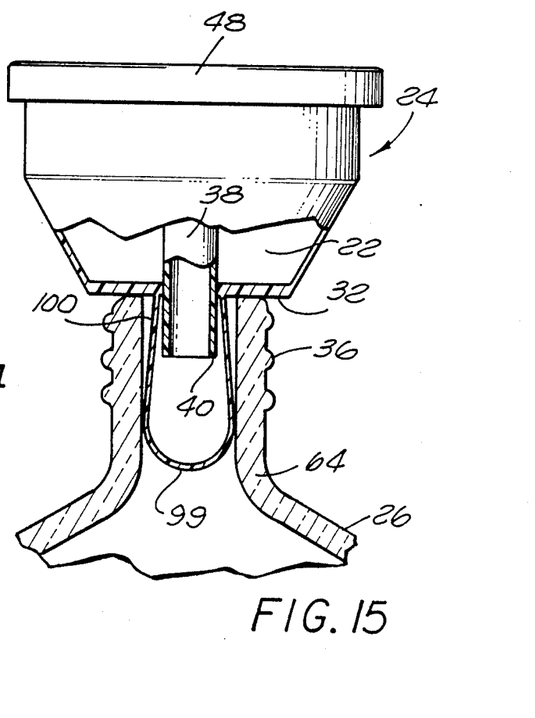
FIG. 15 is a fragmented, partially cross sectional view illustrating mounting of the dispensing unit of FIG. 14 onto a container.

As an alternative to the flexible attachment means shown in FIGS. 1-13, a spring loop 99 of flexible spring material can be used. As shown in FIGS. 14 and 15, a length of such spring material is attached at its opposite ends 100 to the bottom wall 32 of the dispensing unit 20 in a manner forming the spring loop 99. This spring loop 99 is flexible enough to permit insertion into a variety of different sized container necks 64 while providing sufficient structural integrity for attaching the dispensing unit 20 to a container 26.

Prior to insertion into a container, the flexible spring loop 99 is squeezed together into a compressed configuration which slides into many different sized containers. Once the spring loop is within the container neck 64, its flexible material will expand to its original shape thereby trapping itself within the container (FIG. 15). The spring loop engages the interior of the container neck to hold the dispensing unit atop the neck in a sealed relationship.

Yet another alternative usage of flexible attachment means is illustrated in FIG. 16. In this modified version, a dispensing unit 102 can be attached in an inverted position to the neck 64 of a container 26 by use of flexible attachment arms 104 which engage the threads 36 on the neck. The attachment arms 104 are integrally formed with the cylindrical side wall 30 such that the arms project therefrom into dispensing chamber 22. Preferably, three relatively thin attachment arms 104 are provided equidistantly spaced around the inside of the cylindrical side wall 30. Various numbers of attachment arms 104 can be utilized within the design constraint that the attachment arms 104 must not be provided in a number sufficient to substantially hinder the dispensing of fluid from the dispensing chamber 22.

When one desires to dispense from the dispensing unit 102, the unit is affixed onto a container 26 in the same manner as the dispensing unit 20 shown in FIG. 2. To achieve the configuration of FIG. 2, the cap 48 is detached from the position illustrated in FIG. 16 by removal of the plug or boss 56 from within the sleeve 38. It should be noted that a cap 48 intended for use with the modified dispensing unit 102 should not be permanently attached thereto by a flexible hinge, or the like. Following removal of the cap 48, the dispensing unit 102 is removed by disengaging the attachment arms 104 from the threads 36. Then, the dispensing unit 102 is re-oriented such that the gripping fingers 28 face downwardly and the unit 102 is reattached onto neck 64 by engaging gripping fingers 28 with the threads 36 (as in FIG. 2). Once the cap 48 is used to close the dispensing chamber 22 in the manner illustrated in FIG. 2, the modified version of FIG. 16 can be used to dispense a selected one of a plurality of measured amounts by following the dispensing procedures already described.

When one desires to seal the container 26 for storage, etc., the dispensing unit 102 is used in the closure configuration illustrated in FIG. 16. To achieve this configuration, the cap 48 is removed from atop the cylindrical side wall 30 and the gripping fingers 28 are disengaged from the container neck 64. Then, the dispensing unit 102 is inverted to the orientation depicted in FIG. 16, wherein the gripping fingers 28 point upwardly. Next, the dispensing unit 102 is pressed downwardly onto the neck 64 of the container 26 such that the attachment arms 104 engage the threads 36. Finally, the sleeve 38 is sealed by inserting the plug 56 of the cap 48 therein. As an alternative to the attachment arms 104, the interior of the dispensing chamber 22 can be provided with attachment means which thread onto the neck 64. Preferably, a spiral type thread should be used to permit threaded engagement with various sizes of container threads 36.

From the foregoing, it will be appreciated that the dispensing unit of the invention can advantageously dispense a selected one of a plurality of different measured amounts from a container in a sanitary manner, by utilizing economically disposable dispensing components. Further, the dispensing unit of the invention can be manipulated into a configuration for holding a sealed-off volume within which the accuracy of a measured amount can be preserved during handling or transport. Moreover, the present invention is utilized in a manner which advantageously eliminates those manipulative steps which may result in procurement of an inaccurate quantity during the measurement step, or which may ruin the accuracy by allowing additional liquid to mix with the measured amount during the dispensing step. Yet another beneficial feature of the dispensing unit is that it has a geometry which can be removably attached quickly and easily to a variety of different sized containers.

While several particular forms of the invention have been illustrated and described, it will also be apparent that various modifications can be made without departing from the spirit and the scope of the invention. Accordingly, it is not intended that the invention be limited, except as by the appended claims.

I claim:

1. An apparatus for dispensing a measured amount of a flowable substance, comprising:
   a container defining a storage reservoir for receiving and holding a volume of the flowable substance; and
   a disposable dispensing unit in fluid communication with the container, said dispensing unit having a dispensing chamber capable of holding the measured amount of the substance, wherein the dispensing chamber is defined in part by a generally cup-shaped housing having a cylindrical side wall and a bottom wall, the dispensing unit including:

means defining an opening to the outside of the dispensing unit;

cap means for removably covering the opening;

an open sleeve extending through an opening in the bottom wall and defining a flow path for the substance to flow from the storage reservoir to the dispensing chamber and for allowing air displaced from the dispensing chamber by the substance to vent from the dispensing chamber into the storage reservoir, said sleeve having a measurement end disposed within the dispensing chamber at a position relative to the side wall to determine the measured amount, wherein said dispensing unit is removable from the container while holding the measured amount; and valve means carried by said sleeve for preventing flow of the substance through said sleeve, wherein said cap means includes means for opening said valve means to permit flow of the substance through said sleeve.

2. An apparatus as in claim 1, wherein the valve means includes at least one flexible flap movable between open and closed positions for respectively permitting and preventing flow of the substance through said sleeve, wherein the cap means includes means for depressing said at least one flap when said cap means covers the opening, said at least one flap being normally in said closed position when said cap means is removed from the opening.

3. An apparatus as in claim 1, including attachment means for removably mounting the dispensing unit to the container, said attachment means being adapted for adjustable attachment with a wide variety of container sizes.

4. An apparatus as in claim 3, wherein said attachment means includes a plurality of flexible gripping fingers, each of said fingers having a flanged end for engagement with the container.

5. An apparatus as in claim 3, wherein said attachment means includes a spring loop, defined by a length of flexible material having its opposite ends attached to the bottom wall of the dispensing unit.

6. An apparatus as in claim 1, wherein the sleeve and the housing are movable one relative to the other such that the position of the sleeve relative to the side wall is adjustable for varying the measured amount to be dispensed.

7. An apparatus as in claim 1, including means for movably positioning said sleeve relative to said side wall.

8. An apparatus as in claim 7, wherein the measurement end of the sleeve includes an indicator arm extending therefrom and the side wall includes indicia corresponding to various volume levels, whereby a selected one of a plurality of different measured amounts is chosen by varying the position of the sleeve measurement end relative to said indicia.

9. An apparatus as in claim 1, wherein said cap means is integrally formed with the housing such that the dispensing unit forms a one-piece removable drinking cup.

10. An apparatus as in claim 9, wherein the disposable one-piece removable drinking cup is comprised of paper.

11. An apparatus as in claim 1, wherein said cap means is adapted to allow use of a straw during dispensing.

12. An apparatus for dispensing a measured amount of a flowable substance, comprising:

a container defining a storage reservoir for receiving and holding a volume of the flowable substance; and a disposable dispensing unit in fluid communication with the container, said dispensing unit having a dispensing chamber capable of holding the measured amount of the substance, wherein the dispensing chamber is defined in part by a generally cup-shaped housing having a cylindrical side wall and a bottom wall, the dispensing unit including:

means defining an opening to the outside of the dispensing unit;

cap means for removably covering the opening; and an open sleeve extending through an opening in the bottom wall and defining a flow path for the substance to flow from the storage reservoir to the dispensing chamber and for allowing air displaced from the dispensing chamber by the substance to vent from the dispensing chamber into the storage reservoir, said sleeve having a measurement end disposed within the dispensing chamber at a position relative to the side wall to determine the measured amount, wherein said dispensing unit is removable from the container while holding the measure amount; and means for movably positioning said sleeve relative to said side wall, at least a portion of the sleeve having a foldable, accordion-like structure.

13. A dispensing unit for dispensing a selected measured amount of a flowable substance from a storage compartment within a container attached to the unit, said dispensing unit comprising:

a generally cup-shaped housing defining a dispensing chamber capable of holding the measured amount of the substance, the cup-shaped housing having a cylindrical side wall and a bottom wall, said dispensing unit including:

means defining an opening to the outside of the housing;

conduit means having an upper open measurement end extending into the dispensing chamber and defining an open flow path in fluid communication between the dispensing chamber and the storage compartment, whereby the substance can flow from said storage compartment to said dispensing chamber via said flow path upon inversion of the unit and container attached thereto, and air displaced from the dispensing chamber by the substance can escape from the dispensing chamber into the storage compartment via said flow path, the position of the measurement end relative to the side wall being variable and determining the selected measured amount upon return of the unit to an upright position;

attachment means for removably attaching the dispensing unit to the container; and cap means for removably covering the opening to the outside of the housing, said cap means including sealing means for sealing engagement with the measurement end of the conduit means when said cap means closed the opening;

said cap means including a hollow, open-ended cylindrical sleeve adapted for holding a straw in a manner permitting one to drink said measured amount from said dispensing chamber using said straw.

14. An apparatus as in claim 13, wherein the dispensing unit is removable from the container while holding the measured amount.

15. An apparatus as in claim 13, wherein said attachment means includes first attachment means disposed on an exterior surface of the bottom wall of the cup-shaped housing, and second attachment means disposed within said dispensing chamber, said first attachment means engaging said container when said dispensing unit is oriented such that the opening to the outside of the housing is upwardly open, and said second attachment means engaging said container when said dispensing unit is oriented such that the opening is downwardly open.

16. An apparatus as in claim 15, wherein said first attachment means comprises a plurality of flexible gripping fingers and said second attachment means comprises a plurality of attachment arms.

17. An apparatus as in claim 13, wherein said attachment means is adjustable for attachment with a wide variety of different container sizes.

18. An apparatus as in claim 17, wherein said attachment means includes a spring loop for connection to the container by insertion of the spring loop therein.

19. A dispensing unit for dispensing a selected measured amount of a flowable substance from a storage compartment within a container attached to the unit, said dispensing unit comprising:
a generally cup-shaped housing defining a dispensing chamber capable of holding the measured amount of the substance, the cup-shaped housing having a cylindrical side wall and a bottom wall, said dispensing unit including:
means defining an opening to the outside of the housing;
conduit means having an upper open measurement end extending into the dispensing chamber and defining an open flow path in fluid communication between the dispensing chamber and the storage compartment, whereby the substance can flow from said storage compartment to said dispensing chamber via said flow path upon inversion of the unit and container attached thereto, and air displaced from the dispensing chamber by the substance can escape from the dispensing chamber into the storage compartment via said flow path, the position of the measurement end relative to the side wall being variable and determining the selected measured amount upon return of the unit to an upright position;
attachment means for removably attaching the dispensing unit to the container; and
cap means for removably covering the opening to the outside of the housing, said cap means including sealing means for sealing engagement with the measurement end of the conduit means when said cap means closes the opening;
said side wall including a foldable wall portion movable between an extended position and a collapsed position folded upon itself, and further wherein said conduit means is movably supported relative to said side wall.

20. An apparatus for dispensing a measured amount of a flowable substance, comprising:
a container defining a storage reservoir for receiving and holding a volume of the flowable substance; and
a dispensing unit in fluid communication with the container, said dispensing unit having a dispensing chamber capable of holding the measured amount of the substance, wherein the dispensing chamber is defined in part by a generally cup-shaped housing having a cylindrical side wall and a bottom wall, the dispensing unit including:
means defining an opening to the outside of the dispensing unit;
cap means for removably covering the opening;
a drinking straw carried by said cap means and extending into said dispensing chamber when said cap means covers the opening, said straw having a first end disposed generally adjacent to said bottom wall when said cap means covers the opening and a second end disposed outside the dispensing chamber; and
an open sleeve extending through an opening in the bottom wall and defining a flow path for the substance to flow from the storage reservoir to the dispensing chamber and for allowing air displaced from the dispensing chamber by the substance to vent from the dispensing chamber into the storage reservoir, said sleeve having a measurement end disposed within the dispensing chamber at a position relative to the side wall to determine the measured amount.

21. An apparatus as in claim 20 including attachment means for removably connecting said dispensing unit on said container.

22. An apparatus as in claim 20 wherein said measurement end of said sleeve is adjustably disposed within the dispensing chamber to permit variable selection of the measured amount.

23. A dispensing unit for dispensing a selected measured amount of a flowable substance from a storage compartment within a container attached to the unit, said dispensing unit comprising:
a generally cup-shaped housing defining a dispensing chamber capable of holding the measured amount of the substance, the cup-shaped housing having a cylindrical side wall and a bottom wall, said dispensing unit including:
means defining an opening to the outside of the housing;
conduit means having an upper open measurement end extending into the dispensing chamber and defining an open flow path in fluid communication between the dispensing chamber and the storage compartment, whereby the substance can flow from said storage compartment to said dispensing chamber via said flow path upon inversion of the unit and container attached thereto, and air displaced from the dispensing chamber by the substance can escape from the dispensing chamber into the storage compartment via said flow path, the position of the measurement end relative to the side wall being variable and determining the selected measured amount upon return of the unit to an upright position;
attachment means for removably attaching the dispensing unit to the container; and
cap means for removably covering the opening to the outside of the housing, said cap means including a drinking straw to permit drinking of said measured amount from said dispensing chamber using said straw.

* * * * *